Patented Feb. 7, 1950

2,496,419

UNITED STATES PATENT OFFICE 2,496,419

PRODUCTION OF CYCLOPROPANE

Leo H. Sommer, State College, Pa., assignor to Dow Corning Corporation, Midland, Mich., a corporation of Michigan No Drawing. Application June 3, 1949, Serial No. 97,086

3 Claims. (Cl. 260—666)

The present invention relates to methods for the production of cyclopropane.

Present methods for the production of cyclopropane result in a product which is quite impure, and which then needs substantial purification by fractionation from other hydrocarbons boiling in closely the same range. This purification results in the price of the relatively pure product being exceedingly high.

Objects of the present invention are the provision of methods for the direct production of relatively pure cyclopropane.

In accordance with the present invention compounds of the type $R_3Si(CH_2)_3X$ are contacted with an aluminum halide whereby the corresponding triorganosilicon halide and cyclopropane are produced. The reaction occurs spontaneously with the liberation of cyclopropane.

The organosilanes which may be employed in the present invention are free of aliphatic unsaturation. Thus, R in the above formula represents substituents of the group consisting of alkyl and monocyclic aryl. The fourth group linked to the silicon atom is a gamma-halogenopropyl radical in which the halogen may be either chlorine or bromine. It is to be noted that in the present reaction the triorganosilyl radical is present as such both in the starting material and in one of the two products, i. e., in the triorganosilicon halide. Accordingly, the three silicon carbon bonds are inert in the present reaction, as are likewise these three organic substituents.

When the gamma-halogenopropyl silane is contacted with the aluminum halide, which may be either aluminum trichloride or aluminum tribromide, the reaction occurs spontaneously with the liberation of cyclopropane. Evaporation of the cyclopropane formed causes a considerable cooling of the reaction mixture, whereby in order to continue evaporation of the cyclopropane it is desirable to heat the reaction mixture at or above room temperature. The evaporation of the cyclopropane may sweep some of the triorganosilicon halide, formed during the reaction, out of the reaction mixture and into the product. The lowest boiling of the triorganosilicon halides boils at a temperature much higher than cyclopropane, whereby it may be separated readily by distillation. Likewise, the triorganosilicon halide may be hydrolyzed and the disiloxane, produced upon the condensation of the hydrolysis product, separated from the cyclopropane.

The present reaction is conducted with the silane reactant in liquid phase.

The aluminum halide which is employed herein may be present in trace amounts. It is, however, preferred to employ at least one-half per cent by weight of the aluminum halide, based upon the weight of the silane employed. In general, no advantage is obtained by employing over 10% by weight of aluminum halide based upon the weight of the silane.

Example 1

Sublimed aluminum chloride in amount of 0.2 g. was added to 19.1 g. of gamma-bromopropyltrimethylsilane. The reaction was spontaneous and liberated cyclopropane immediately at a temperature of 25° C. Heat was applied to maintain the reaction mixture at room temperature and the reaction mixture was finally raised to a temperature of 70° C. A 92% yield was obtained.

Example 2

The procedure of Example 1 was repeated employing gamma-chloropropyltrimethylsilane. Equivalent results were obtained.

That which is claimed is:

1. The method of producing cyclopropane which comprises contacting a composition of the general formula $R_3Si(CH_2)_3X$, in which each R represents a substituent of the group consisting of alkyl and monocyclic aryl and X represents a substituent of the group consisting of chlorine and bromine, with an aluminum halide, whereby the silane is decomposed with the formation of a composition of the formula $R_3SiX$ and cyclopropane.

2. The method for the production of cyclopropane which comprises contacting trimethylgammachloropropylsilane with an aluminum halide at a temperature of at least room temperature whereby cyclopropane is formed.

3. The method for the production of cyclopropane which comprises contacting trimethylgammabromopropylsilane with an aluminum halide at a temperature of at least room temperature whereby cyclopropane is formed.

LEO H. SOMMER.

No references cited.